(12) United States Patent
Tsuboi et al.

(10) Patent No.: US 6,911,747 B2
(45) Date of Patent: Jun. 28, 2005

(54) X-Y STAGE SYSTEM WITH ONBOARD LINEAR MOTOR

(75) Inventors: Takaaki Tsuboi, Kanagawa-ken (JP); Eiji Ida, Kanagawa-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 128 days.

(21) Appl. No.: 10/639,591

(22) Filed: Aug. 13, 2003

(65) Prior Publication Data

US 2004/0051403 A1 Mar. 18, 2004

(30) Foreign Application Priority Data

Sep. 13, 2002 (JP) ........................................ 2002-268360

(51) Int. Cl.[7] .............................................. H02K 41/00
(52) U.S. Cl. ............................ 310/12; 355/53; 355/72
(58) Field of Search ............................. 310/12; 355/53, 355/72

(56) References Cited

U.S. PATENT DOCUMENTS 4,808,892 A * 2/1989 Dreibelbis .................. 318/135
5,962,937 A * 10/1999 Wavre ......................... 310/12
2004/0061383 A1 1/2004 Tsuboi et al. ................ 310/13

FOREIGN PATENT DOCUMENTS

| JP | 9-266660 | 10/1997 | .......... H02K/41/02 |
| JP | 2000-333435 | 11/2000 | .......... H02K/41/03 |
| JP | 2004-72960 | 3/2004 | .......... H02K/41/03 |

* cited by examiner

Primary Examiner—Darren Schuberg
Assistant Examiner—Judson H. Jones
(74) Attorney, Agent, or Firm—Browdy and Neimark, P.L.L.C.

(57) ABSTRACT

An X-Y stage system is disclosed which is easy to assemble and compact or slim in construction. Both the X- and Y-stages are allowed to move without getting influence from the magnetic force created by the field magnets. The X-Y stage system has an X-stage movable relatively to a bed through a linear motion guide unit in an X-direction, and a Y-stage movable relatively to the X-stage through another linear motion guide unit in a Y-direction. The linear motors to force the X- and Y-stages are composed of paired field magnets of secondary side held to the bed and the Y-stage, respectively, and armature windings of primary side supported on the opposite sides of the X-stage in a way lying in clearances between the opposing field magnets.

10 Claims, 12 Drawing Sheets

X-Y STAGE SYSTEM WITH ONBOARD LINEAR MOTOR

BACKGROUND OF THE INVENTION

1. Field of the Invention

The present invention relates to an X-Y stage system with onboard linear motor, which has been extensively used in machinery including semiconductor and liquid display manufacturing equipment, measuring instruments, assembling machines, tool machines, industrial robots, conveyors and, more particularly, to an X-Y stage system with onboard linear motor in which an armature winding of primary side is installed on, for example, a turntable while a field magnet of secondary side lies on a stationary bed.

2. Description of the Prior Art

In recent years, current multi-axis stage systems and moving mechanisms such as X-Y plotters employed in the diverse technical fields using machinery as stated earlier have required more and more a position-control stage, which is made compact or slim in construction and light in weight, and moreover able to operate with high propulsion, high speed and high response to allow a moving object including works, tools, articles and instruments to move relatively to a machine base into any desired position with high travel speed and precise position control. Most X-Y stage systems of the sort as stated earlier have usually incorporated with a linear motor to drive either of an X-stage and Y-stage. Linear motors involve two broad types. The first, called moving-coil linear motor has a plurality of moving-armature windings. The second, called moving-magnet linear motor has many moving-field magnets of permanent magnet.

In Japanese Patent Laid-Open No. 266660/1997, which was filed for a senior invention of the same applicant as in the present application, there is disclosed an X-Y table system having solenoid-operated linear actuators. With the prior X-Y table system, armature windings for the primary side of the solenoid-operated linear actuators are laid in an intermediate moving member and connected electrically to an outside console through openings in the intermediate moving members while guide means are constituted with linear motion guide units of such sort as allowed to roll over only a definite travel by virtue of crossed-rollers. The table system recited just above can be considered to be a way to make the system itself compact or slim in construction.

Another Japanese Patent Laid-Open No. 2000-333435, also filed for another senior invention of the same applicant as in the present application, discloses a slider unit with onboard moving-coil linear motor, in which the field magnet of secondary side is made up of field magnet sheets lying on confronting surfaces of vertically opposing sides of a horseshoe-shaped magnet yoke sidewise open in cross section, the field magnet sheets being juxtaposed closely side by side in such a way that unlike poles alternate lengthwise in polarity and also oppose directly to each other across an air gap. The armature windings of primary side are each made of a three-phase coreless coil wound in the shape of rectangle. Many armature windings are disposed closely side by side on a coil support to complete the armature winding assembly, which extends into the air gap through the sidewise opening of the magnet yoke. With the prior slider unit recited earlier, the horseshoe-shaped magnet yoke of integral structure helps render the slider unit itself compact in construction.

Meanwhile, production systems linked with semiconductors, for example semiconductor manufacturing equipment, measuring instruments, assembling machines, and so on can advance greatly in years and correspondingly makes a growing demand for X-Y stage systems and angular position control stage systems that can operate with high precision, high speed, high propulsion, high response and clean environment, even with made far compact or slim in construction and far inexpensive in production cost, compared with the conventional slider unit.

With the prior X-Y stage system constructed as stated earlier, the field magnets of secondary side are arranged on the upper surface of the stationary bed and the lower surface of the Y-table, one to each surface, and therefore magnetic attraction exerted constantly between the field magnets and the coil yoke with the armature windings may causes any deformation on both the bed and the Y-table, which might account for any error in precision.

Thus, it remains a major challenge to provide a slider unit with onboard moving-magnet linear motor, which advances in conduction system for armature windings, selection of material for field magnet, selection of encoder high in resolving-power and fixture construction of sensor cords to make the slider unit nimble in operation, less in weight, compact and simple in construction, far more precise in position control as well as far more speedy in response of the X-Y table relatively to the bed, large in angle allowed for angular movement in circular direction upon position control, reduced in overall height as low as possible, and inexpensive in production cost.

SUMMARY OF THE INVENTION

The present invention, therefore, has as its primary object to overcome the subject as described just above and more particular to provide an X-Y stage system with onboard linear motor, which is made as small as possible in overall height, compact and simple in construction to provide easier and quicker assemble of parts and components, allowing the armature winding assembly to move without causing any interference in electrical cords during the movement of the X- and/or Y-stage, which might otherwise raise dust and dirt, thereby helping keep the sliding area against foreign matter, even with making sure of highly precise position control of the X- and Y-stages and far inexpensive production cost. It is a further object of the present invention to provide an X-Y stage system with onboard linear motor in which the armature windings and the field magnets are arranged in opposition to each other, any one for any of the turntable and the bed, the other for the residual one, thereby making it possible to extend largely an angular movement in circular direction for position control, rendering the position-control stage system itself reduced in overall height, compact and simple in construction, allowing the position-control stage system to work with high precision in clean environment and further produce the stage system with inexpensive cost.

The present invention is concerned with an X-Y stage system comprising a bed, an X-stage movable relatively to the bed through a first linear motion guide unit in an X-direction, and a Y-stage movable relatively to the X-stage through a second linear motion guide unit in a Y-direction; wherein a first linear motor to force the X-stage relatively to the bed in the X-direction is comprised of a pair of first field magnets of secondary side held on an upper surface of the bed, and a first armature winding of primary side suspended from a lower surface of the X-stage in a way lying in a clearance left between the first field magnets; wherein the X-stage is allowed to move relatively to the bed when an electric current existing in the first armature winding interacts electromagnetically with a magnetic flux created by the first field magnets; wherein a second linear motor to force the Y-stage relatively to the X-stage in the Y-direction is comprised of a pair of second field magnets of secondary side held on a lower surface of the Y-stage, and a second armature winding of primary side supported on an upper surface of the X-stage in a way lying in a clearance between the second field magnets; and wherein the Y-stage is allowed to move relatively to the X-stage when an electric current existing in the second armature winding interacts electromagnetically with a magnetic flux created by the second field magnets.

In one aspect of the present invention, there is provided an X-Y stage system wherein the paired first field magnets are juxtaposed side by side on confronting inside surfaces of a first U-shaped magnet yoke in such a fashion that unlike poles alternate in the X-direction and also oppose in polarity to each other across the clearance, the first U-shaped magnet yoke being fastened to the upper surface of the bed; and wherein the paired second field magnets are juxtaposed side by side on confronting inside surfaces of a second U-shaped magnet yoke in such a fashion that unlike poles alternate in the Y-direction and also oppose in polarity to each other across the clearance, the second U-shaped magnet yoke being fastened to the lower surface of the Y-stage.

In another aspect of the present invention, there is provided an X-Y stage system wherein the first magnet yoke fastened to the bed and the second magnet yoke fastened to the Y-stage are each made in an integral construction of U-shape in cross section; and wherein the first armature winding is suspended below the lower surface of the X-stage with a first stay in a way lying in the clearance between the opposing first field magnets while the second armature winding is raised above the upper surface of the X-stage with a second stay in a way lying in the clearance between the opposing second field magnets.

In another aspect of the present invention, there is provided an X-Y stage system wherein a first power supply cable, a first sensor cord and a first signal cord are all laid below the lower surface of the X-stage and connected to a first armature winding assembly that is constituted with more than one first armature winding; and wherein a second power supply cable, a second sensor cord and a second signal cord are all laid above the upper surface of the X-stage and connected to a second armature winding assembly that is constituted with more than one second armature winding.

In another aspect of the present invention, there is provided with an X-Y stage system wherein both the first and second linear motors are constituted with the same components and parts. In a further another aspect of the present invention, there is provided an X-Y stage system wherein the bed, X-stage and Y-stage are all made substantially same square in whole contour.

In another aspect of the present invention, there is provided an X-Y stage system wherein the first linear motion guide unit is comprised of a first guide rail lying on the upper surface of the bed, and a first slider held to the lower surface of the X-stage and fit over the first guide rail for sliding movement, while the second linear motion guide unit is comprised of a second guide rail lying on the upper surface of the X-stage, and a second slider secured to the lower surface of the Y-stage and fit over the second guide rail for sliding movement.

In another aspect of the present invention, there is provided an X-Y stage system wherein the Y-stage is made with a threaded hole at a position opposing to a sensor for an optical encoder installed on the X-stage, and wherein a flush bolt fits in the threaded hole to fasten the sensor to the X-stage and also to adjust the position of the sensor.

In a further another aspect of the present invention, there is provided an X-Y stage system wherein an angular position-control means is mounted on the Y-stage and comprised of a stationary carriage held on the Y-stage, a turntable supported for rotation on the carriage through a rolling-contact bearing, a third linear motor to turn the turntable relatively to the carriage in circular direction, and an encoder to monitor a circular position of the turntable with respect to the carriage.

In another aspect of the present invention, there is provided an X-Y stage system wherein the third linear motor is composed of third armature winding of primary side and third field magnets of secondary side, the third armature windings being each made of a three-phase coreless coil having winding turns wound in a flat circular configuration, and being juxtaposed side by side on the carriage in circular direction around a circular plane of a preselected curvature, while the field magnets being made in the shape of flat sheet and juxtaposed side by side underneath the turntable in circular direction along a circular plane of a preselected curvature in such a way that unlike poles alternate circularly in polarity and also oppose against the third armature windings.

According to the present invention, especially, the magnet yokes secured to the bed and the Y-stage respectively are made in a horse-shoe shape in cross section, inside which field magnets are installed in opposite relation to one another, while the armature winding assemblies are mounted on the opposite sides of the X-stage, one assembly to each side. To assemble the bed, X- and Y-stages into the X-Y stage system, the X-stage is first laid on the bed in a manner the armature winding assembly underneath the X-stage lying in a clearance open sidewise between the field magnets inside the horse-shoe shape magnet yoke on the bed, and then overlaid with the Y-stage in a manner another armature winding assembly above the X-stage lying in a clearance open sidewise between the field magnets inside the horse-shoe shape magnet yoke on the Y-stage. This arrangement described just above helps make the X-Y stage system itself simple in construction and easier to assemble the system. With the X-Y stage system constructed as stated earlier, both the X- and Y-stages are allowed to move precisely without getting influence from the attractive force due to the magnetic force because of the magnetic attraction created by the field magnets being offset in the magnet yoke. Moreover, the X-Y stage system can be produced inexpensive.

Assembling the X-Y stage system of the present invention can be done easily by only joining the components including the bed, X-stage, Y-stage and further the angular position-control means in sequence according to the prescribed process.

In the X-Y stage system according to the present invention, both the bed and the Y-stage are each incorporated thereon with the magnet yoke of U-shape in cross sections, on inside confronting surfaces of which field magnets are supported in opposition across the clearance, while the X-stage is provided on the opposite sides thereof with the armature winding assemblies, each of which lies in the associated clearance between the field magnets of any magnet yoke. The linear motors constructed as stated earlier help cancel out the magnetic attraction due to the field magnets in the magnet yokes, which attraction might otherwise negatively affect the movement of the X- and Y-stages. The linear motor constructed according to the present invention makes sure of highly precise sliding movement, helping construct the X-Y stage system itself far compact in construction and less in overall height, and also making it possible to assemble easily the X-Y stage system with inexpensive production cost.

With the X-Y stage system having the first linear motion guide unit interposed between the bed and the X-stage, just fitting the first slider of the X-stage over the first guide rail of the bed is sufficient to assemble the X-stage with the bed. Moreover, since the second linear motion guide unit lie between the X-stage and the Y-stage, just fitting the second slider of the Y-stage over the second guide rail of the bed is sufficient to join together the Y-stage with the X-stage.

Further assembling the angular position-control means with the X-Y stage system needs only to join the angular position-control means with the Y-stage. With the angular position-control means combined with the X-Y stage system of the present invention, the armature windings and the field magnets are arranged in opposition to each other around a circular plane. This circular arrangement of the armature windings and the field magnets makes certain of position control over a wider angular area in circular direction. Moreover, the armature winding wound in the flat shape and the field magnet made in the rectangular shape help render the X-Y stage system as thin or slim as possible in overall height, resulting in making the X-Y stage system itself compact in construction and also getting high accuracy under clean environment.

With the angular position-control means in which the armature windings and the field magnets are both made in the shape of flat rectangle to exploit their advantage of much less costly production, the armature windings and the field magnets, as opposed to the prior slider unit in which the armature windings and the field magnets are both arranged linearly, are juxtaposed respectively in circular direction, with a spacing between any adjacent two increasing in circular direction as a radial distance becomes larger. This circular arrangement in which the armature windings and the field magnets, both made in the shape of rectangle, simply lie on the disc surfaces in circular direction figures out to accomplish the precise position control or precise angular position control, with even simple in construction. In addition the angular position-control means can be produced much less costly.

DETAILED DESCRIPTION OF THE REFERRED EMBODIMENTS

Preferred embodiments of an X-Y stage system according to the present invention will be explained hereinafter in detail with reference to the accompanying drawings. The X-Y stage system of the present invention is designed to serve well for machinery including semiconductor and liquid display manufacturing equipment, measuring instruments, assembling machines, tool machines, industrial robots, conveyors, and generally provided therein with onboard first and second linear motors. The first linear motor 4 is built in between an X-stage 2 and a stationary bed 1 and made up of first armature windings 9 lying below a lower surface 17 of the X-stage 2 and first field magnets 8 disposed on the stationary bed 1 in opposition to the first armature windings 9. The second linear motor 5 is built in between the X-stage 2 and a Y-stage 3 and made up of second armature windings 11 lying above an upper surface 16 of the X-stage 2 and second field magnets 10 disposed underneath the Y-stage 3 in opposition to the second armature windings 11.

With the X-Y stage system of the present invention, namely, the first linear motor 4 is to move the X-stage 2 relatively to the bed 1 while the second linear motor 5 moves the Y-stage 3 with respect to the X-stage 2.

The X-Y stage system, as shown in FIGS. 1 to 4, has the stationary bed 1, the X-stage 2 supported on the bed 1 for sliding movement in an X-direction relatively to the bed 1 through a first linear motion guide unit 6, and the Y-stage 3 supported on the X-stage 2 for sliding movement relatively to the X-stage 2 through a second linear motion guide unit 7 in a Y-direction normal to the X-direction.

Figure 1:
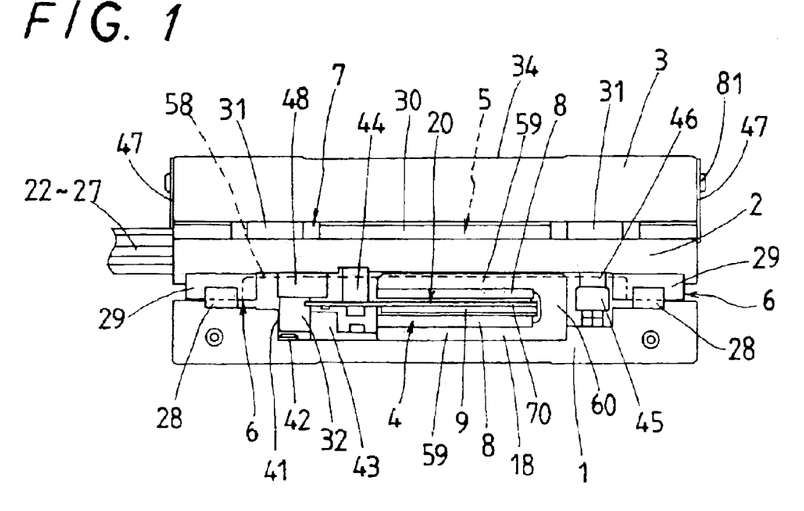
FIG. 1 is a front elevation showing a preferred embodiment of an X-Y stage system with onboard linear motor in accordance with the present invention, but in which an end plate shown in dotted line at one end of a stationary bed is removed.

The first linear motor 4 to force the X-stage 2 relatively to the bed 1 in the X-direction is composed of a pair of field magnets 8 of secondary side held on the bed 1, and the armature windings 9 of primary side mounted to the lower surface 17 of the X-stage 2 in a way disposed in a clearance 13 remaining between the opposed field magnets 8. With the X-Y stage system stated earlier, thus, an electric current existing in the armature windings 9 interacts electromagnetically with a magnetic flux created by the field magnets 8, thereby producing a mechanical force to move the X-stage 2 relative to the bed 1.

Figure 3:
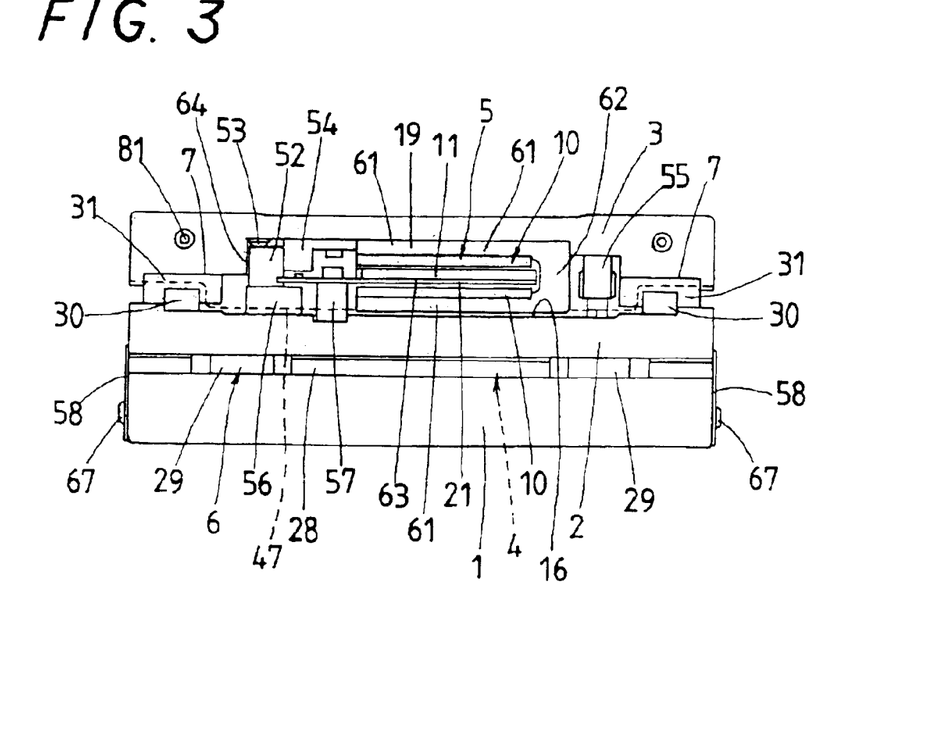
FIG. 3 is a side elevation of the X-Y stage system, seen from the right side of FIG. 1, but in which an end plate shown in dotted line at one end of a Y-stage is removed.

Moreover, the second linear motor 5 to move the Y-stage 3 relative to the X-stage 2 in the Y-direction is comprised of a pair of field magnets 10 of secondary side held to the lower surface 14 of the Y-stage 3, and the armature windings 11 of primary side supported on the upper surface 16 of the X-stage 2 in a way disposed in a clearance 15 left open between the opposed field magnets 10. With the X-Y stage system constructed as stated earlier, an electric current existing in the armature windings 11 interacts electromagnetically with a magnetic flux created by the field magnets 10, thereby producing a mechanical force to move the Y-stage 3 relative to the X-stage 2

On an upper surface 12 of the bed 1 there is mounted a first magnet yoke 18 of sidewise open U-shape in cross section. The paired first field magnets 8 are juxtaposed closely side by side on confronting inside surfaces of the first U-shaped magnet yoke 18 in such a fashion that unlike poles alternate in the X-direction in polarity and also oppose directly to each other across the clearance 13 in the magnet yoke 18. Underneath the lower surface 14 of the Y-stage 3 there is installed a second magnet yoke 19 of sidewise open U-shape in cross section. The paired second field magnets 10 are juxtaposed closely side by side on confronting inside surfaces of the second U-shaped magnet yoke 19 in such a way that unlike poles alternate in the Y-direction in polarity and also oppose directly to each other across the clearance 15 in the magnet yoke 19. The first and second magnet yokes 18, 19 are oriented to intersect one another at right angles when seen in plan view. The Y-stage 3 is recessed at 91 on the lower surface 14 for weight saving.

Figure 4:
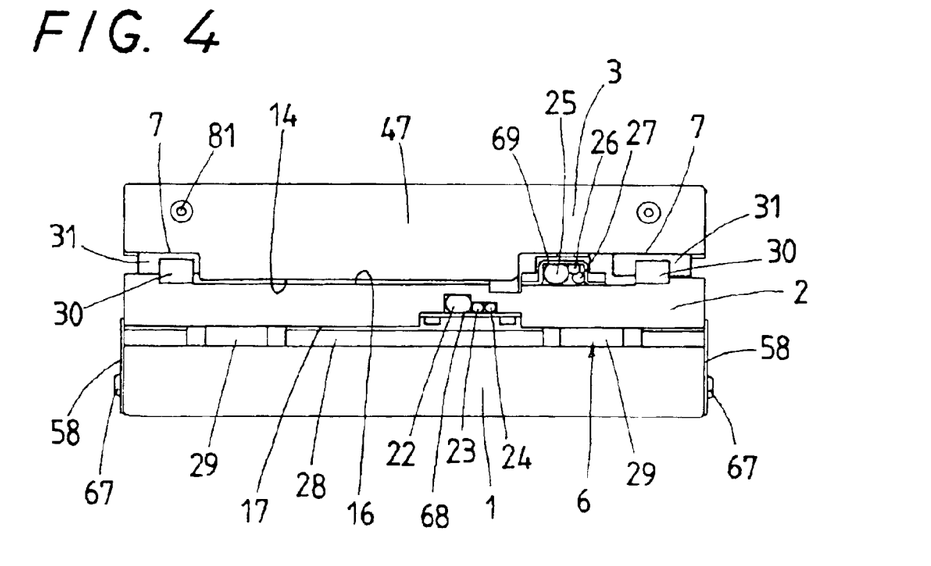
FIG. 4 is a side elevation of the X-Y stage system, seen from the left side of FIG. 1.
Figures 7, 8:
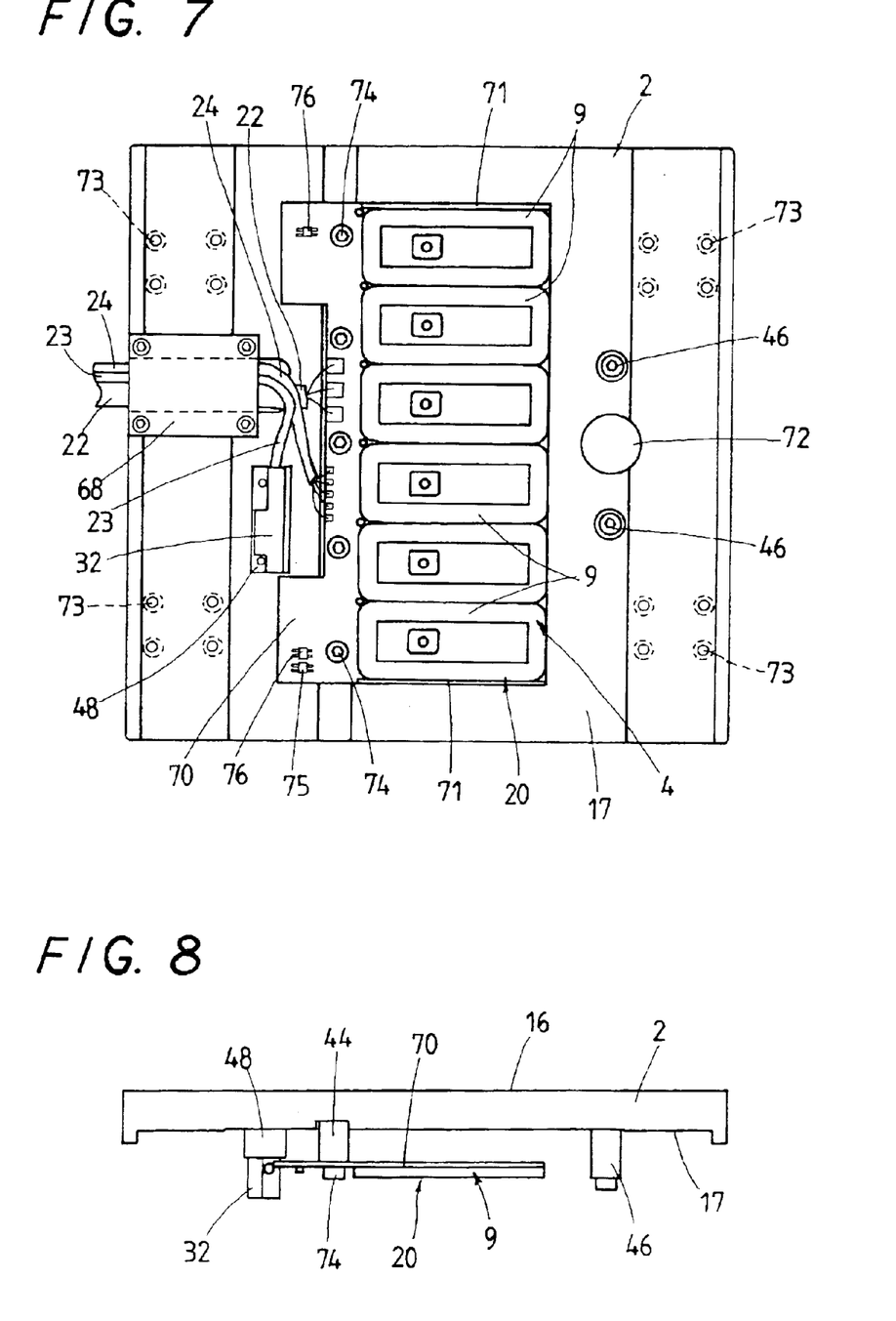
FIG. 7 is a bottom plan view showing an X-stage of the X-Y stage system, on underneath which the desired components are mounted.
FIG. 8 is a front elevation of the X-stage where the components are installed as shown in FIG. 7.

With the X-Y stage system constructed as shown in FIGS. 1, 4 and 7, the first armature windings 9 wound in the shape of rectangle are arranged on the lower surface 17 of the X-stage 2 and held in place with end plates 71 at opposite ends of the armature winding array to provide a first armature winding assembly 20. A first power supply cable 22, first sensor cord 23 and first signal cord 24 are all held together on the lower surface 17 of the X-stage 2 for connection with the first armature winding assembly 20 made up of the first armature windings 9, and further fastened on the lower surface 17 with a cord retainer 68. Besides, the X-stage is made therein with an opening 72, which is used to fit over a stopper bolt 45, and also made with holes 73 that are used to fasten a slider 29 to the X-stage 2.

Figure 11:
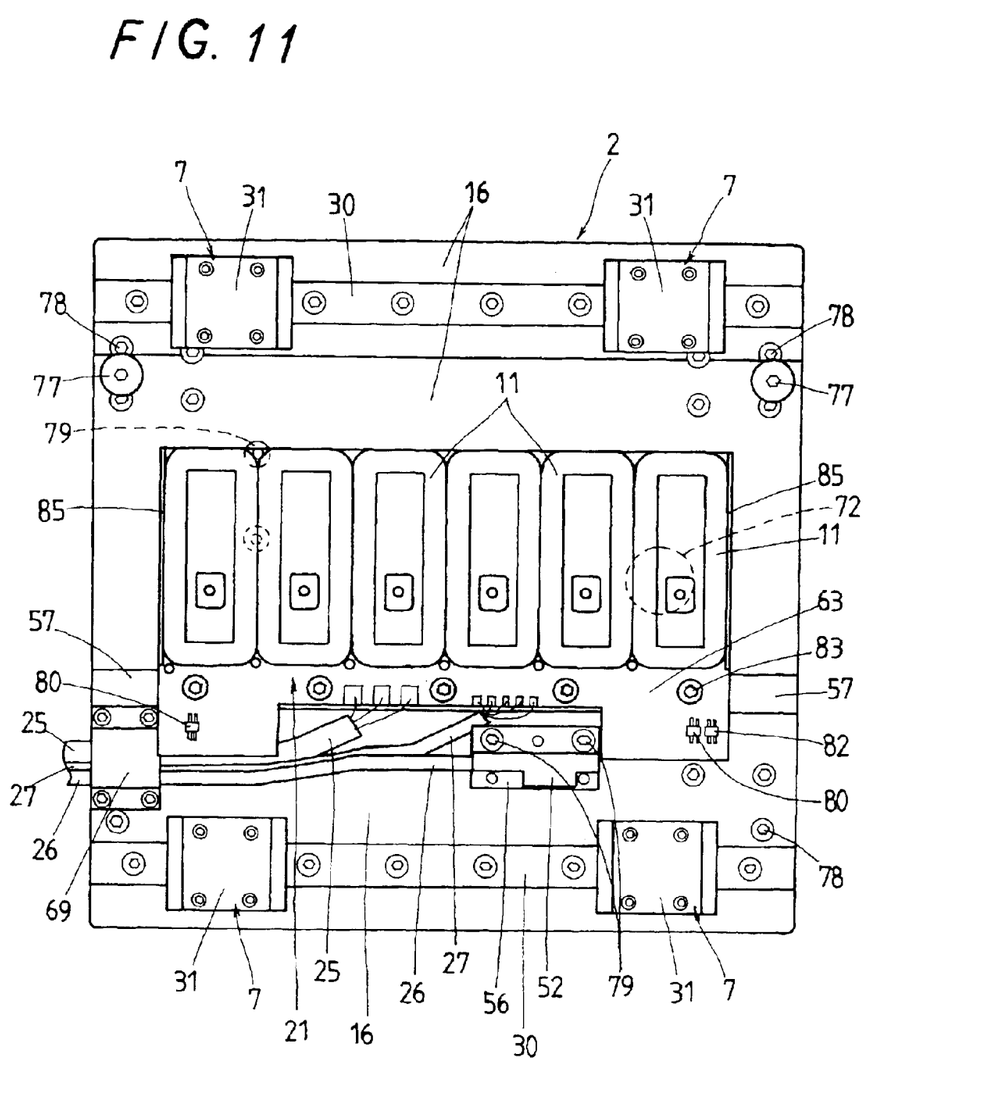
FIG. 11 is a plan view of the X-stage in the X-Y stage system, on which the components are mounted.

Especially referring to FIGS. 3, 4 and 11, the second armature windings 11 wound in the shape of rectangle are disposed on the upper surface 16 of the X-stage 2 and held in place with end plates 85 at opposite ends of the armature winding array to provide a second armature winding assembly 21. A second power supply cable 25, second sensor cord 26 and second signal cord 27 are all held together on the upper surface 16 of the X-stage 2 for connection with the second armature winding assembly 21 made up of the second armature windings 11, and further fastened on the upper surface 16 with a cord retainer 69.

Such construction that the wiring including the power supply cables 22, 25, sensor cords 23, 26, signal cords 24, 27, and so on are all fastened together on the opposite sides of the X-stage 2 as stated earlier helps protect the wiring against getting entangled when the X-stage 2 moves, thereby suffering less damage including breaking of cords. Moreover, both the X- and Y-stages, because of without getting influence from the magnetic attraction due to the magnetic force created by the field magnets 8, 10, are allowed to move smoothly, thus helping make sure of precise position-control in the X-Y stage system.

With the X-Y stage system of the present invention, the magnet yokes 18, 19 held to the bed 1 and Y-stage 3 with fastening bolts 86, 87 respectively are each made of an integral structure of U-shape in cross section. The first armature windings 9, as shown in FIG. 1, are suspended below the lower surface 17 of the X-stage 2 with a first stay 44 in a way lying in the clearance between the opposing field magnets 8 while the second armature windings 11, as seen in FIG. 3, are raised above the upper surface 16 of the X-stage 2 with a second stay 57 in a way lying in the clearance between the opposing field magnets 10. The magnet yokes 18, 19, since being formed in the integral structure of U-shape in cross section as stated earlier, can be made high in stiffness or rigidity and correspondingly made slim or slender in cross-sectioned thickness. This structure of the magnet yoke 18, 19 allows making the magnet yoke 18, 19 less in height, thus making the X-Y stage system itself far compact in construction. The U-shape in cross section of the magnet yoke 18, 19 represents a horseshoe-shape in cross section illustrated in FIG. 9, which is defined by a pair of spaced parallel flat sides 59, 61 and a web 60, 62 joining together the flat sides 59, 61 with one another, the field magnets 8, 10 lying on the opposing inside surfaces of the flat sides 59, 61.

With the X-Y stage system constructed as stated earlier, the first linear motor 4 is installed in between the bed 1 and the X-stage 2 while the second linear motor 5 is built in between the X-stage 2 and the Y-stage 3. Both the first and second linear motors 4, 5 are constituted with the same components and parts.

The linear motor 4, in general, is comprised of the magnet yoke 18 mounted on the bed 1, the field magnets 8 set in array on the confronting inside surfaces of the flat sides 59 of the magnet yoke 18, a first coil support 70 suspended below the X-stage 2 with the stay 44, and armature windings 9 arranged on the coil support 70. The coil support 70 is secured to the lower surface 17 of the X-stage 2 by using a fastening bolt 74.

Moreover, the linear motor 5, in general, is comprised of the magnet yoke 19 secured to the Y-stage 3, the field magnets 10 set in array on the confronting inside surfaces of the flat sides 61 of the magnet yoke 19, a second coil support 63 raised above the X-stage 2 with the stay 57, and armature windings 11 arranged on the coil support 63. The coil support 63 is held to the upper surface 16 of the X-stage 2 by using a fastening bolt 83.

The bed 1, X- and Y-stages 2, 3 are all made substantially same square in whole contour seen in plan view. The X-Y stage system constructed as stated earlier, because there are provided therein with the onboard linear motors 4, 5 and also the bed and stages are all made in a substantially same configuration, can be made compact in construction, easier to use it and inexpensive to produce it. The linear motors 4, 5 are each made as shown, for example, in FIGS. 9 and 10. The field magnets 8, 10 are each $tm$ in thickness and $Lm$ in length while the armature windings 9, 11 are each tc in thickness and Lc in length. Moreover, each armature winding 9, 11 is Lp in length between the middles of lengthwise opposing coil ends, which is nearly as large as the length Lm of the field magnet. The field magnets 8, 10 each has a width of Wm and unlike poles are disposed successively with a pitch of Pm. The armature windings 9, 11 each are Wc in width and unlike poles are disposed successively with a pitch of Pc. Moreover, the armature windings 9, 11 each are B in width between the middles of widthwise opposing coil sides. Dimensions of the field magnets 8, 10 and the armature windings 9, 11 are determined in such a relation that the Pm is equal with the Wm: (Pm=Wm) and the Pm is also the same with the B: [B(=Pm=Wm)]. Moreover, the Pc is set as same as the Wc: (Pc=Wc) and also set 4/3 of the Wm: [Pc=(4/3)Wm].

Smooth movement of the X-stage 2 relative to the bed 1 can be expected through a first linear motion guide unit 6 while the Y-stage 3 is allowed to move with respect to the X-stage by virtue of a second linear motion guide unit 7. The first linear motion guide unit 6 is comprised of a first guide rail 28 lying on the upper surface 12 of the bed 1, and a first slider 29 held to the lower surface 17 of the X-stage 2 and fit over the elongated guide rail 28 for sliding movement. The second linear motion guide unit 7 is comprised of a second guide rail 30 lying on the upper surface 16 of the X-stage 2, and a second slider 31 secured to the lower surface 14 of the Y-stage 3 and fit over the elongated guide rail 30 for sliding movement.

Assembly of the X-stage 2 on the bed 1 can be easily carried out by operations of fastening the guide rail 28 of the linear motion guide unit 6 on the bed 1, then laying the X-stage 2 on the slider 29 that has fit over the guide rail 28, and then driving fastening bolts into bolt holes 73 made in the X-stage 2 in alignment with threaded holes in the slider 29. Mounting of the Y-stage 3 on the X-stage 2 will be made by the steps of fastening the guide rail 30 of the linear motion guide unit 7 to the X-stage 2, thereafter matching a mounting surface 90 of the Y-stage 3 with the slider 31 that has fit over the guide rail 30, and finally screwing fastening bolts 50 into bolt holes 89 made in the Y-stage 3 in alignment with threaded holes in the slider 31.

Assembling the X-Y stage system accurate in position control and less in production cost, thus, can be done well by only joining the components in sequence according to the prescribed process that will be explained below with reference to FIGS. 5 to 13.

Figure 12:
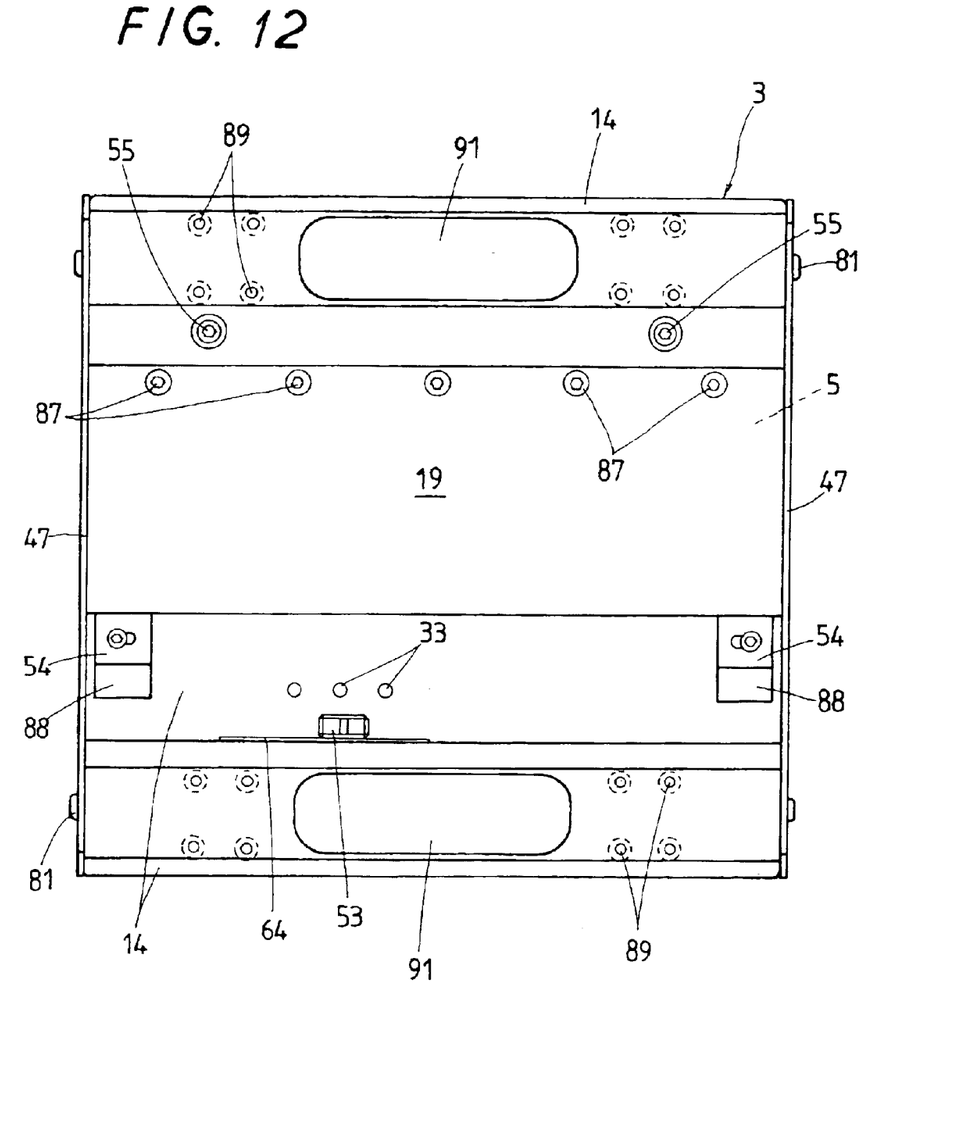
FIG. 12 is a bottom plan view of the Y-stage in the X-Y stage system, on which the components are mounted.

With the X-Y stage system constructed as stated earlier, the Y-stage 3 is made with threaded holes 33, refer to FIG. 12, at a position opposing to a sensor 52 for an optical encoder installed on the X-stage 2. Flush bolts 49, refer to FIG. 2, fit in the threaded holes 33 to fasten the sensor 52 to the X-stage and also to adjust the position of the sensor 52. Therefore, they make it possible to assemble the components and parts in sequence following the prescribed process to provide the X-Y stage system that is accurate in position control and less in production cost. The Y-stage 3 is made on the upper surface 34 thereof with threaded holes 51 that are used to fasten works to the Y-stage 3. When any works, not shown, need processing with the help of the X-Y stage system stated earlier, the object including any works, instruments, and so on is first loaded on the Y-stage 3, followed by simply fixed to the Y-stage 3 with fastening bolts that are screwed into threaded holes 51.

Detection means to determine a position of the X-stage 2 respective to the bed 1 includes a linear scale 41 attached lengthwise to the inside of a raised portion of the bed 1, an origin mark 42 affixed adjacent to the linear scale 41 on the upper surface 12 of the bed 1, and a sensor 32 suspended below the lower surface 17 of the X-stage 2 to sense the linear scale 41 and the origin mark 42. The sensor 32 is secured to the lower surface 17 of the X-stage 2 through a spacer 48. Another detection means to determine a position of the Y-stage 3 with respect to the X-stage 2 is comprised of a linear scale 64 attached lengthwise to the inside of a downward thick portion of the Y-stage 3, an origin mark 53 affixed adjacent to the linear scale 64 on the lower surface 14 of the Y-stage 3, and a sensor 52 mounted on the upper surface 16 of the X-stage 2 to sense the linear scale 64 and the origin mark 53. The sensor 52 is secured to the upper surface 16 of the X-stage 2 through a spacer 56.

On the bed 1 there is provided a pair of limiters 43 to define a tolerable stroke range where the X-stage 2 is allowed to move relatively to the bed 1. The limiters 53 are each finished in a reflective mirror 66 over an upper surface thereof. The armature winding assembly 20 suspended below the lower surface 17 of the X-stage 2 is provided with an optical limit sensor 76 and an optical before-the-origin sensor 75 to sense the limiters 43. The Y-stage 3, as with the bed 1, has a pair of limiters 54 to define a tolerable stroke range where the Y-stage 3 is allowed to move relatively to the X-stage 2. Each limiter 54 is also finished in a reflective mirror 88 over an upper surface thereof. The armature winding assembly 21 raised above the upper surface 16 of the X-stage 2 has an optical limit sensor 80 and an optical before-the-origin sensor 82 to sense the limiters 54.

Figure 15:
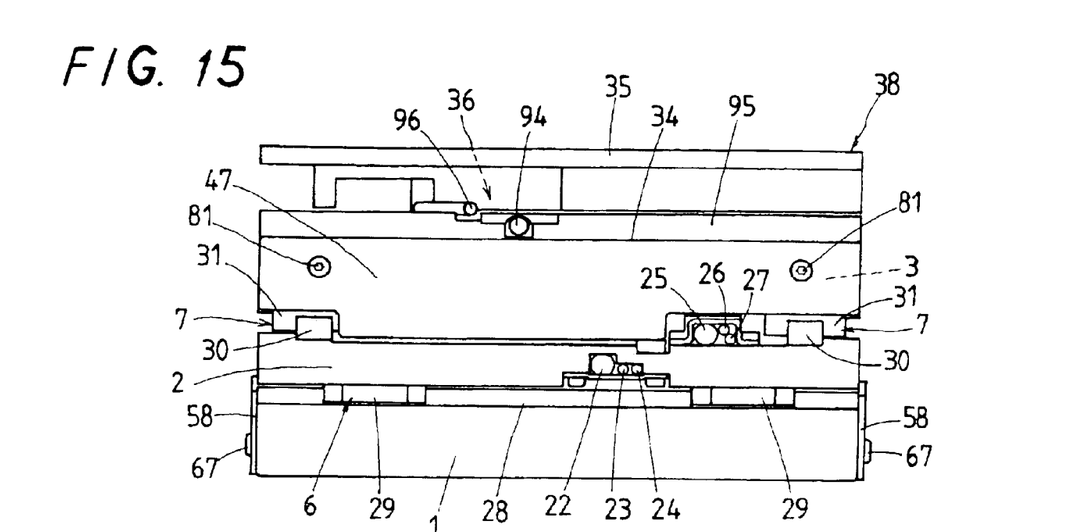
FIG. 15 is a front elevation showing the X-Y stage system on which there is installed an angular position-control stage in circular direction.
Figure 16:
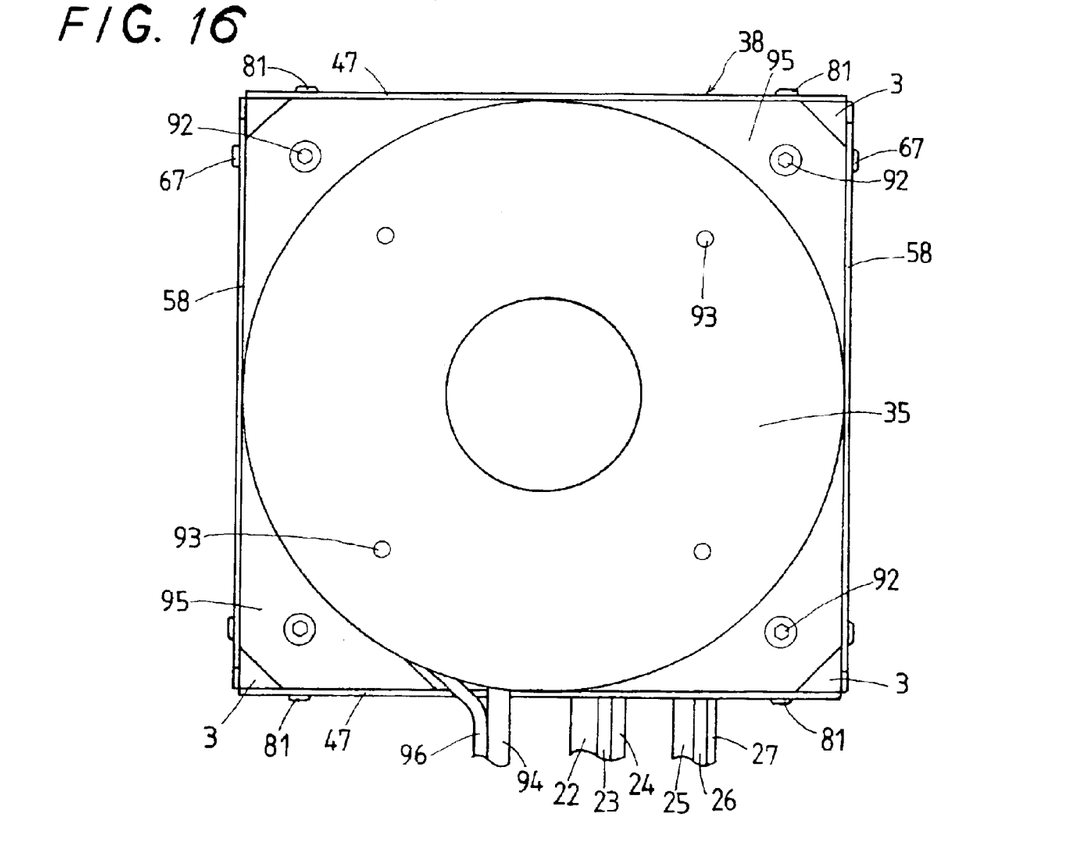
FIG. 16 is a plan view of the angular position-control stage mounted on the X-Y stage system shown in FIG. 15.

As an alternative version shown in FIGS. 15 and 16, the X-Y stage system of the present invention is equipped thereon with an angular position-control means 38 to provide an accurate position control in circular direction. The angular position-control means 38 is comprised of a stationary carriage 95 and a turntable 35 for circular position control, the carriage 95 being made at four corners thereof with bolt holes 51 in which fastening bolts 92 are screwed to hold the carriage 95 on the upper surface 34 of the Y-stage 3, while the turntable 35 being bored with threaded holes 93 that are used to fasten any work thereto.

The circular position-control means 38 mounted on the X-Y stage system of the present invention can be constituted as being disclosed in, for example, Japanese Patent Application No. 2002-232274, which was filed for a senior invention of the same applicant as in the present application, thereby providing an XY θ-stage system compact in construction. Thus, the disclosure of Japanese Patent Application No. 2002-232274 is incorporated herein by reference to explain the detail of the circular position-control means 38. The present description hereinafter will be largely confined to major construction of the circular position-control means 38.

Figure 17:
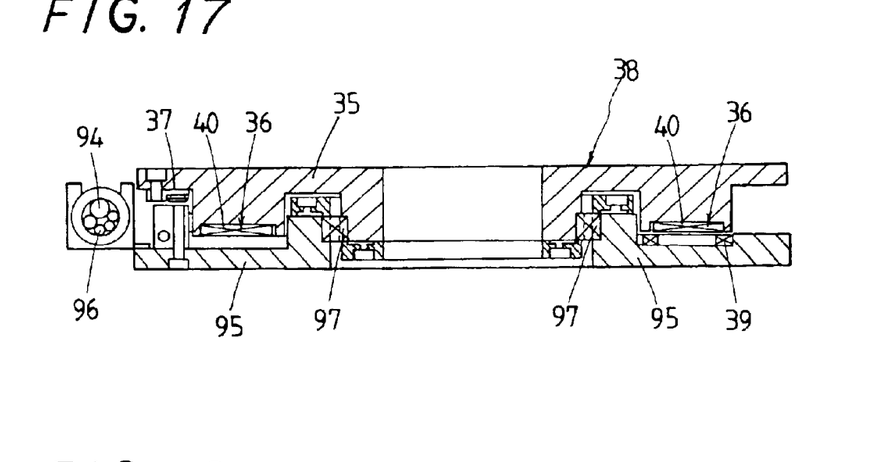
FIG. 17 is a cross-sectional view showing a preferred embodiment of the angular position-control stage shown in FIG. 15.

With the X-Y stage system constructed as will be stated later, the circular position-control means 38 is comprised of the carriage 95 held on the Y-stage 3, the turntable 35 supported for rotation on the carriage 95 through a rolling-contact bearing 97, a third linear motor 36 to turn the turntable 35 relatively to the carriage 95 in circular direction, and an encoder 37 to monitor a circular position of the turntable 35 with respect to the bed 1.

The turntable 35 is made therein with threaded holes 93 that are used to fasten any object including a work, an instrument and so on to the turntable 35. The third linear motor 36 is made up of third armature windings 39 of primary side and third field magnets 40 of secondary side.

Figure 18:
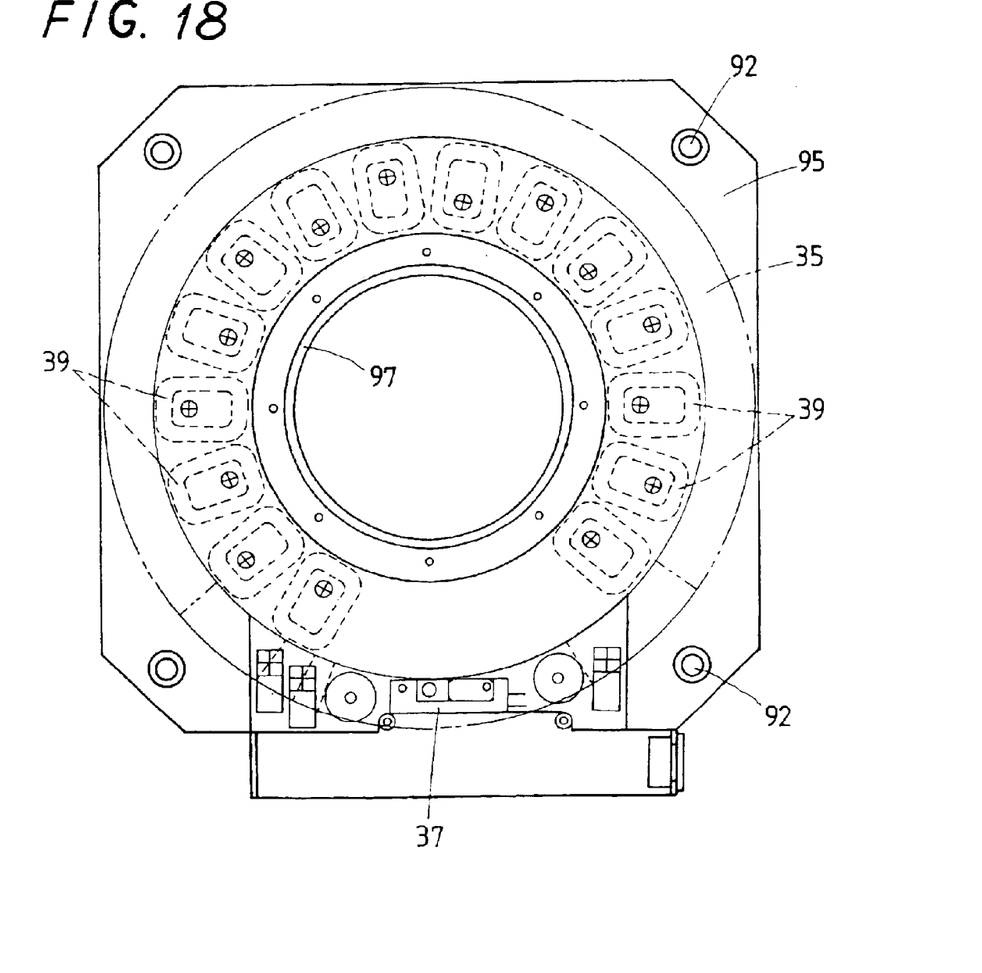
FIG. 18 is a plan view of a stationary carriage of the angular position-control stage shown in FIG. 17, in which a turntable is removed to expose the carriage.

The armature windings 39 are each made of a three-phase coreless coil having winding turns wound in a flat circular configuration, and juxtaposed side by side on the carriage 95 in circular direction around a circular plane of a preselected curvature. The armature windings 39 are connected to a power supply cable 94, sensor cord and signal cord 96.

Figure 19:
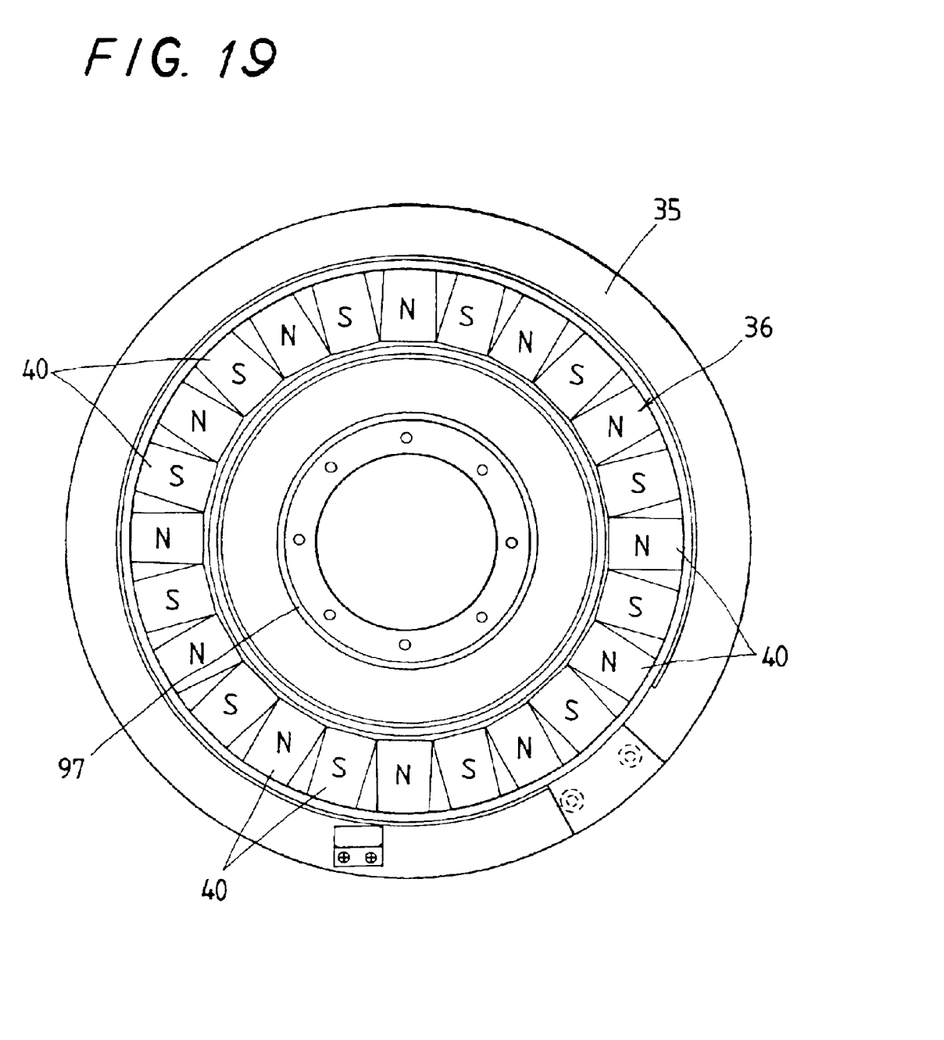
FIG. 19 is a bottom plan view of the turntable in the angular position-control stage shown in FIG. 17.

The field magnets 40 are made in the shape of flat sheet and juxtaposed closely side by side underneath the turntable 35 in circular direction around a circular plane of a preselected curvature in such a way that unlike poles alternate circularly in polarity and also oppose against the armature windings 39 across an air gap.

Here will be described how to assemble the X-Y stage system with the circular position control means. This X-Y stage system can be orderly completed with ease by joining the components one after another through the sequence of the bed 1, first linear motion guide units 6, X-stage 2, second linear motion guide units 7, Y-stage 3 and circular position-control means 38. Each of the bed 1, X- and Y-stages 2, 3 is equipped with necessary parts and components prior to joining the bed 1, X- and Y-stages 2, 3 in sequence stated just earlier.

Figure 5:
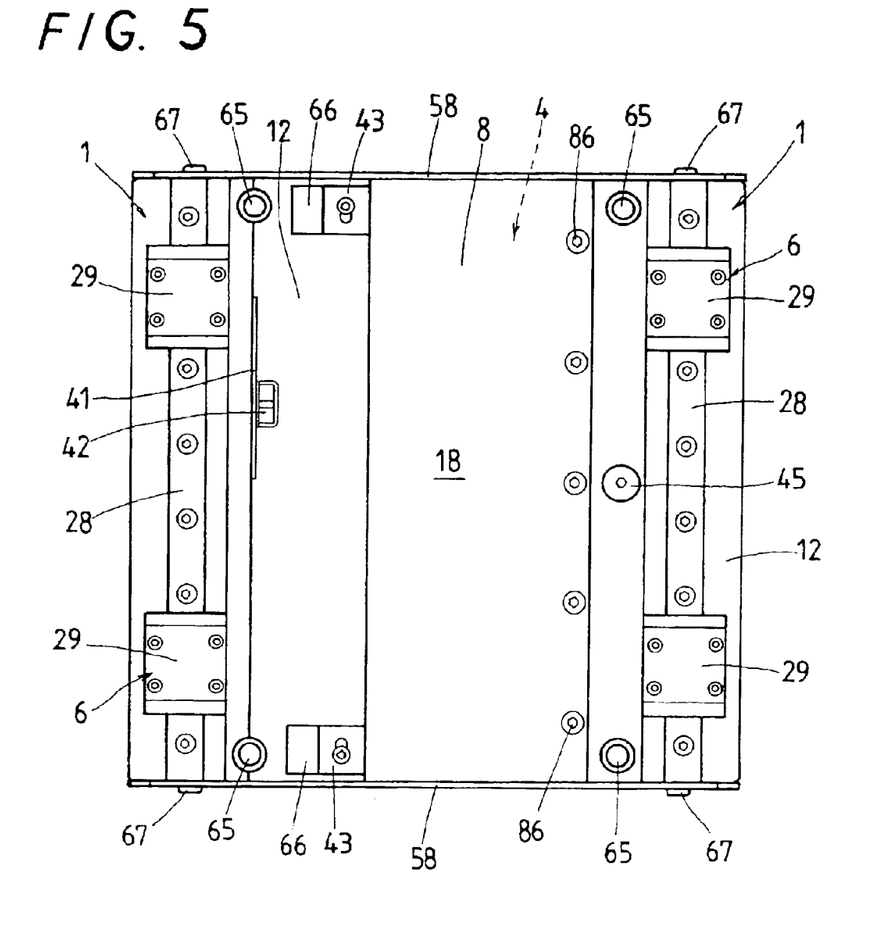
FIG. 5 is a plan view of the X-Y stage system in which parts and components have been assembled together on the bed.
Figure 6:
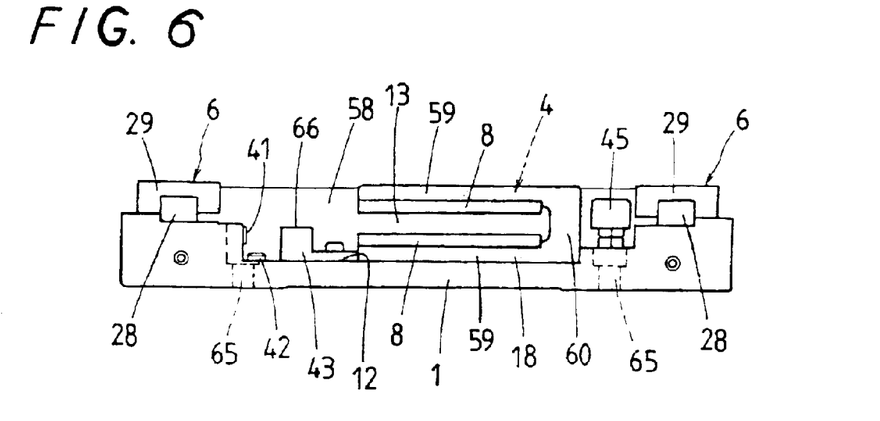
FIG. 6 is a front elevation showing the same condition found in FIG. 5, but in which any one end plate is removed.
Figure 9:
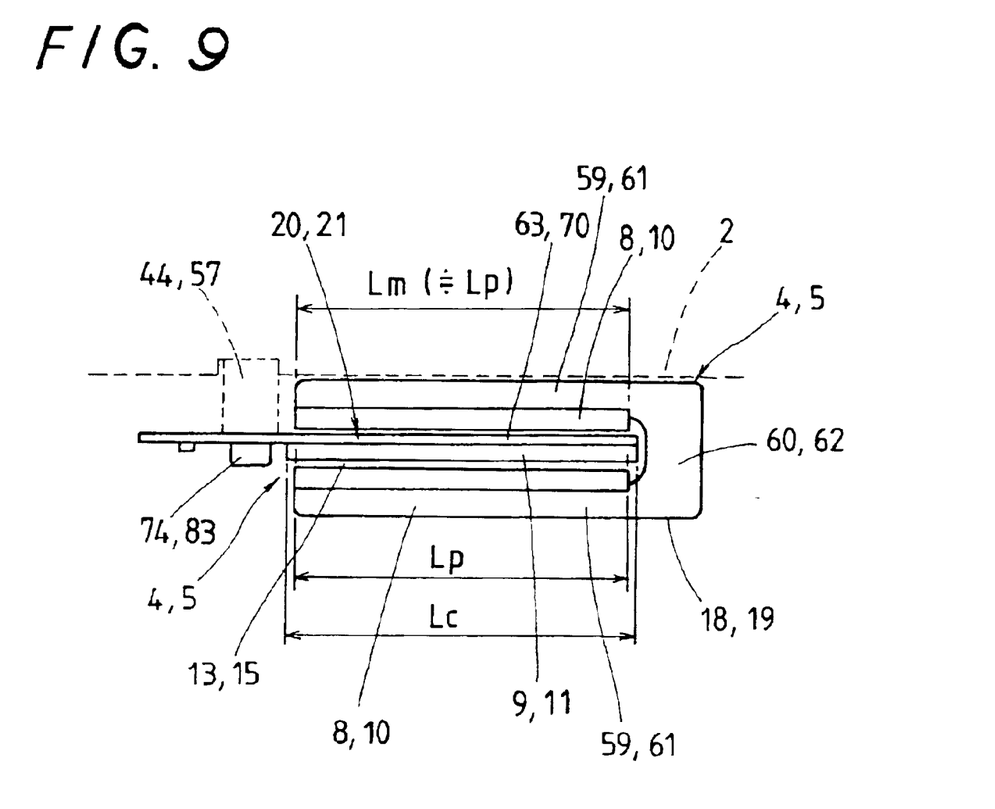
FIG. 9 is a schematic front elevation to explain a linear motor in which field magnets are disposed in a magnet yoke of sidewise open U-shape and an armature winding assembly lies in an air gap made in the magnet yoke.
Figure 10:
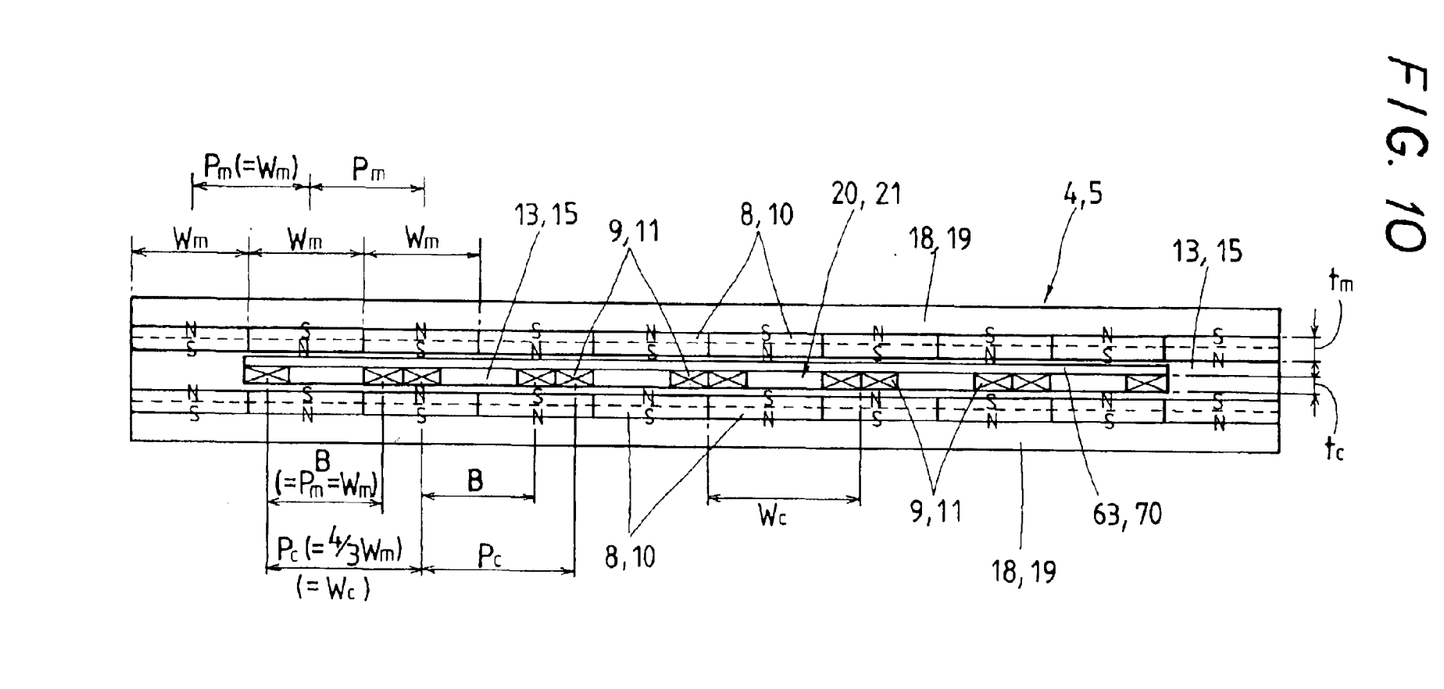
FIG. 10 is an explanatory illustration, partially in lengthwise section, of the linear motor shown in FIG. 9.

Various components are first mounted on the upper surface 12 of the bed 1 as shown in FIGS. 5 and 6. On the upper surface 12 of the bed 1 there are secured the magnet yoke 18 inside which the field magnets 8 are arranged in a way extending in the X-direction, a pair of linear motion guide units 6 lying in the X-direction, the limiters 43 disposed at opposite ends in the X-direction, one to each end, the optical linear scale 41 and the origin mark 42. The end plates 58 to close the opposite ends of the magnet yoke 18 will be abutted with-fastening bolts 67 against the opposite ends of the bed 1, which are flush with the opposite ends of the magnet yoke 18 after the Y-stage has been assembled last on the X-stage. A stopper bolt 45, moreover, will be fastened to the bed 1 through the opening 72 in the X-stage 2 after the X-stage 2 has been mounted in a way stated later. Many components or parts, as shown in FIGS. 7 and 8, are suspended below the lower surface 17 of the X-stage 2 at their respective locations matching their associated components on the bed 1. That is to say, the X-stage 2 is installed on the lower surface 17 thereof with the stay 44 to suspend the armature winding assembly 20 below the X-stage 2, the sensor 32 of the optical encoder, the wiring for the armature winding assembly 20 and the sensor 32 including the power supply power 22, sensor cord 23 and signal cord 24, and a pair of stopper bolts 46. Then, the X-stage 2 is laid on the bed 1 in a relation that the armature winding assembly 20 below the X-stage 2, as shown in FIGS. 9 and 10, is in the air gap 13 between the opposing inside surface of the magnet yoke 18 where the field magnets 10 lie in opposition across the air gap 13.

Next, four sliders 29 for the paired linear motion guide units 6 on the bed 1 are held to the lower surface 17 of the X-stage 2 with fastening bolts 78, as shown partially in FIG. 11, which are manipulated from the upper surface 16 of the X-stage 2. Moreover, the sensor 52 is adjusted properly in position and set on the lower surface 17 of the X-stage 2 with fastening bolts that are driven from the upper surface 16 of the X-stage 2. The stopper bolt 45 is also screwed into the bed 1 through the opening 72 from the upper surface 16 of the X-stage 2.

Mounted on the upper surface 16 of the X-stage 2 as shown in FIG. 11 are various components or parts: the paired linear motion guide units 7 lying in the Y-direction normal to the X-direction, the armature winding assembly 21 disposed in the Y-direction above the X-stage 2 through the stay 57, the sensor 52 of the optical encoder, and the wiring for the armature winding assembly 21 and the sensor 52 including the power supply power 25, sensor cord 26 and signal cord 27. The stopper bolts 77 will be set to the X-stage 2 after the Y-stage has been laid above the X-stage 2.

Figure 2:
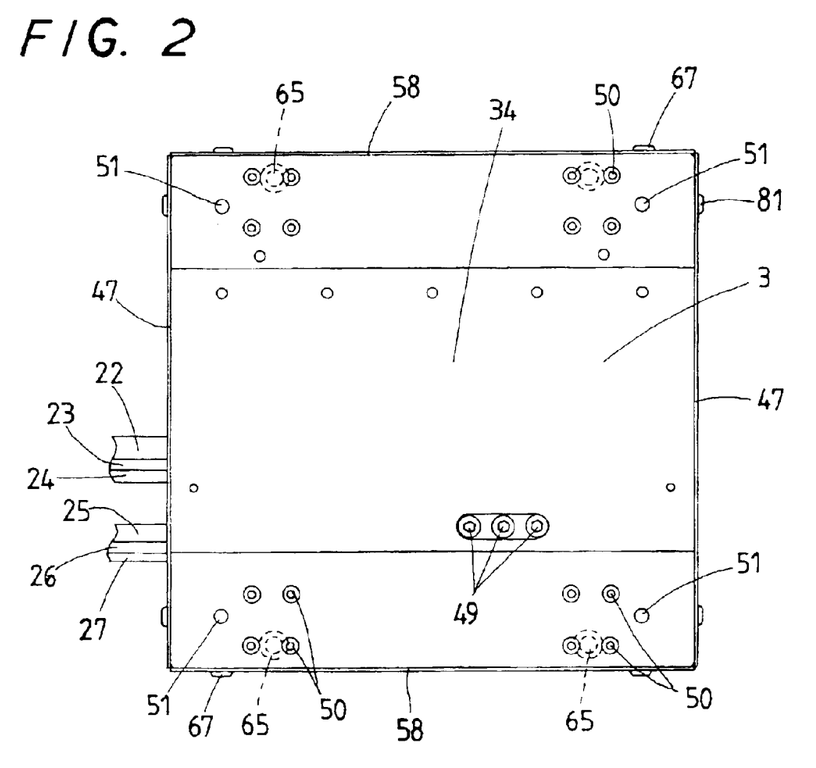
FIG. 2 is a plan view showing the X-Y stage system of FIG. 1.
Figure 13:
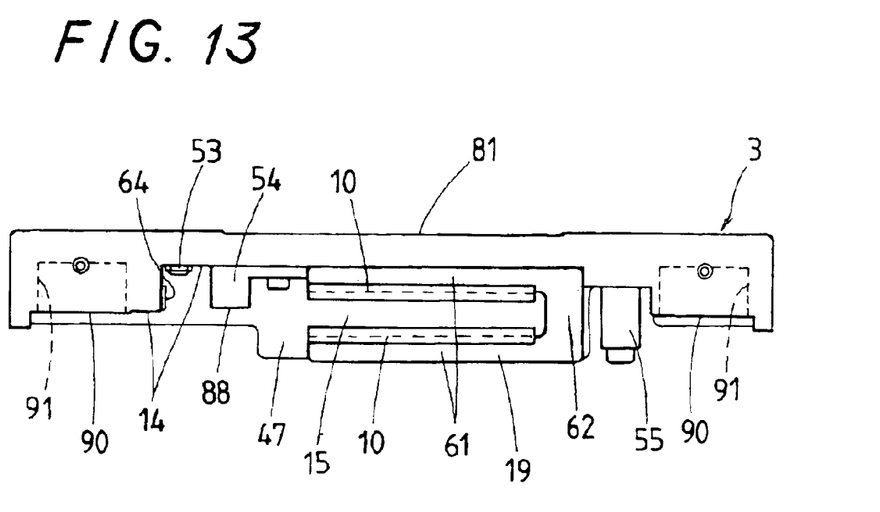
FIG. 13 is a side elevation of the Y-stage in the X-Y stage system, on the bottom side of which there are mounted the components, seen from the left side of FIG. 12, but in which an end plate is removed.
Figure 14:
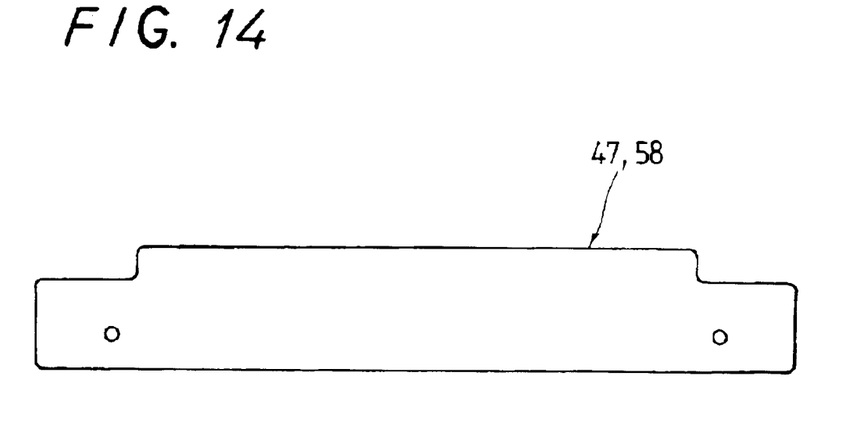
FIG. 14 is a front elevation of the end plate.

Many components or parts, as shown in FIGS. 12 and 13, are suspended below the lower surface 14 of the Y-stage 3 at their respective locations matching their associated components on the upper surface 16 of the X-stage 2. On the lower surface 14 of the Y-stage 3, there are installed the magnet yoke 19, the paired limiters 54 arranged at opposite ends, the optical linear scale 64, the origin mark 53, and a pair of stopper bolts 55. Four sliders 31 for the paired linear motion guide units 7 on the X-stage 2 are connected to the lower surface 14 of the Y-stage 3 with fastening bolts 50, which are manipulated from the upper surface 34 of the Y-stage 3 after the Y-stage 3 has been laid over the X-stage 2 as shown in FIG. 2. Then, the sensor 52 disposed on the upper surface 16 of the X-stage 2 is adjusted properly in position through the threaded holes 33 opened to the upper surface 34 of the Y-stage 3, and held with the flush bolts 49 fit in the threaded holes 33. The Y-stage 3 is moved side to side to screw any one of the paired stopper bolts 77 into the upper surface 16 of the X-stage 2. The end plates 58 shown in FIG. 14 are finally attached to the opposite ends of the bed 1 to close the lengthwise ends of the magnet yoke 18 while other end plates 47 are fastened to the opposite ends of the Y-stage 3 to close the lengthwise ends of the magnet yoke 19.

When the circular position-control means 38 is needed besides the X-Y stage system constructed as stated earlier, the worker has only to lay and then fasten the circular position-control means 38 on the Y-stage 3 that has been placed on the X-stage 2 as stated above. The circular position-control means 38, because of the turntable 35 being supported for rotation on the carriage 95 through the rolling-contact bearing 97, can be easily secured to the Y-stage 3 by just the steps of bringing bolt holes in the carriage 95 into alignment with the threaded holes 51 in the Y-stage 3 and driving fastening bolts 92 into the threaded holes 51 through the bolt holes in the carriage 95 to join together them.

Accordingly, while the present invention has been disclosed in connection with the preferred embodiments thereof, it should be understood that other embodiments may fall within the spirit and scope of the present invention, as defined by the following claims.

What is claimed is:

1. An X-Y stage system comprising a bed, an X-stage movable relatively to the bed through a first linear motion guide unit in an X-direction, and a Y-stage movable relatively to the X-stage through a second linear motion guide unit in a Y-direction;

wherein a first linear motor to force the X-stage relatively to the bed in the X-direction is comprised of a pair of first field magnets of secondary side held on an upper surface of the bed, and a first armature winding of primary side suspended from a lower surface of the X-stage in a way lying in a clearance between the first field magnets;

wherein the X-stage is allowed to move relatively to the bed when an electric current existing in the first armature winding interacts electromagnetically with a magnetic flux created by the first field magnets;

wherein a second linear motor to force the Y-stage relatively to the X-stage in the Y-direction is comprised of a pair of second field magnets of secondary side held on a lower surface of the Y-stage, and a second armature winding of primary side supported on an upper surface of the X-stage in a way lying in a clearance between the second field magnets; and wherein the Y-stage is allowed to move relatively to the X-stage when an electric current existing in the second armature winding interacts electromagnetically with a magnetic flux created by the second field magnets.

2. An X-Y stage system constructed as recited in claim 1, wherein the paired first field magnets are juxtaposed side by side on confronting inside surfaces of a first U-shaped magnet yoke in such a fashion that unlike poles alternate in the X-direction and also oppose in polarity to each other across the clearance, the first U-shaped magnet yoke being fastened to the upper surface of the bed; and wherein the paired second field magnets are juxtaposed side by side on confronting inside surfaces of a second U-shaped magnet yoke in such a fashion that unlike poles alternate in the Y-direction and also oppose in polarity to each other across the clearance, the second U-shaped magnet yoke being fastened to the lower surface of the Y-stage.

3. An X-Y stage system constructed as recited in claim 2, wherein the first magnet yoke fastened to the bed and the second magnet yoke fastened to the Y-stage are each made in an integral construction of U-shape in cross section; and wherein the first armature winding is suspended below the lower surface of the X-stage with a first stay in a way lying in the clearance between the opposing first field magnets while the second armature winding is raised above the upper surface of the X-stage with a second stay in a way lying in the clearance between the opposing second field magnets.

4. An X-Y stage system constructed as recited in claim 1, wherein a first power supply cable, a first sensor cord and a first signal cord are all laid below the lower surface of the X-stage and connected to a first armature winding assembly that is constituted with more than one first armature winding; and wherein a second power supply cable, a second sensor cord and a second signal cord are all laid above the upper surface of the X-stage and connected to a second armature winding assembly that is constituted with more than one second armature winding.

5. An X-Y stage system constructed as recited in claim 1, wherein both the first and second linear motors are constituted with the same components and parts.

6. An X-Y stage system constructed as recited in claim 1, wherein the bed, X-stage and Y-stage are all made substantially same square in whole contour.

7. An X-Y stage system constructed as recited in claim 1, wherein the first linear motion guide unit is comprised of a first guide rail lying on the upper surface of the bed, and a first slider held to the lower surface of the X-stage and fit over the first guide rail for sliding movement, while the second linear motion guide unit is comprised of a second guide rail lying on the upper surface of the X-stage, and a second slider secured to the lower surface of the Y-stage and fit over the second guide rail for sliding movement.

8. An X-Y stage system constructed as recited in claim 1, wherein the Y-stage is made with a threaded hole at a position opposing to a sensor for an optical encoder installed on the X-stage, and wherein a flush bolt fits in the threaded hole to fasten the sensor to the X-stage and also to adjust the position of the sensor.

9. An X-Y stage system constructed as recited in claim 1, wherein an angular position-control means is mounted on the Y-stage and comprised of a stationary carriage held on the Y-stage, a turntable supported for rotation on the carriage through a rolling-contact bearing, a third linear motor to turn the turntable relatively to the carriage in circular direction, and an encoder to monitor a circular position of the turntable with respect to the carriage.

10. An X-Y stage system constructed as recited in claim 9, wherein the third linear motor is composed of third armature winding of primary side and third field magnets of secondary side, the third armature windings being each made of a three-phase coreless coil having winding turns wound in a flat circular configuration, and being juxtaposed side by side on the carriage in circular direction around a circular plane of a preselected curvature, while the field magnets being made in the shape of flat sheet and juxtaposed side by side underneath the turntable in circular direction along a circular plane of a preselected curvature in such a way that unlike poles alternate circularly in polarity and also oppose against the third armature windings.

* * * * *